(12) United States Patent
Jaworski

(10) Patent No.: US 6,504,349 B2
(45) Date of Patent: Jan. 7, 2003

(54) PULSE WIDTH MODULATED VOLTAGE REGULATION CIRCUIT AND RELATED METHODS

(75) Inventor: Frank B. Jaworski, Boxborough, MA (US)

(73) Assignee: Sipex Corporation, Billerica, MA (US)

( * ) Notice: Subject to any disclaimer, the term of this patent is extended or adjusted under 35 U.S.C. 154(b) by 0 days.

(21) Appl. No.: 09/789,851

(22) Filed: Feb. 21, 2001

(65) Prior Publication Data

US 2001/0038279 A1 Nov. 8, 2001

Related U.S. Application Data

(60) Provisional application No. 60/185,627, filed on Feb. 29, 2000.

(51) Int. Cl.[7] ............................. G05F 1/40; H02M 7/19
(52) U.S. Cl. ........................ 323/280; 323/288; 363/60; 307/110
(58) Field of Search ...................... 363/60, 59; 307/109, 307/110; 323/209, 280, 288

(56) References Cited

U.S. PATENT DOCUMENTS

| 5,627,739 A | | 5/1997 | Yung-Chow et al. ......... 363/60 |
| 6,055,168 A | * | 4/2000 | Kotowski et al. ............. 363/60 |
| 6,081,164 A | * | 6/2000 | Shigemori et al. ............ 331/16 |

FOREIGN PATENT DOCUMENTS

| EP | 0 540 948 B1 | 3/1996 | |
| EP | 0 715 237 A2 | 6/1996 | |
| EP | 0 862 260 A2 | 9/1998 | |
| JP | 06351229 | 12/1994 | ............ H02M/3/07 |

OTHER PUBLICATIONS

Maxim, "Comparator and Charge Pump Converts 3V to 5V", *Maxim Integrated Products*, 3 pages (2000).
Linear Technology, "Step–Up/Step–Down SwitchedCapacitor DC/DC Converters with Low–Battery Comparator", *Linear Technology Corporation*, 8 Pages, (1997).
Linear Technology, "Micropower, Regulated 3.3V/5V Charge Pump with Shutdown in SOT–23", *Linear Technology Corporation*, 12 pages, (1999).

* cited by examiner

*Primary Examiner*—Bao Q. Vu
(74) *Attorney, Agent, or Firm*—Testa, Hurwitz & Thibeault, LLP

(57) ABSTRACT

A circuit and method for providing a regulated output voltage is described. The circuit includes a capacitor array, a comparator and an output control module. The capacitor array receives an input voltage, first and second control signals, and generates a regulated output voltage in response. The comparator compares the regulated output voltage and a reference voltage, and generates a comparator signal in response. The output control module receives the comparator signal and the first control signal. In response, the output control module provides the second control signal to the capacitor array.

34 Claims, 11 Drawing Sheets

PULSE WIDTH MODULATED VOLTAGE REGULATION CIRCUIT AND RELATED METHODS

RELATED APPLICATIONS

This application claims priority to pending provisional application, Ser. No. 60/185,627, filed on Feb. 29, 2000, the contents of which are incorporated herein by reference.

FIELD OF THE INVENTION

The invention relates generally to a circuit that provides a regulated output voltage and more specifically to a circuit that uses a pulse width modulated technique to generate the regulated output voltage.

BACKGROUND OF THE INVENTION

Many electronic applications of today require the use of circuits capable of providing a stable output voltage given a range of input voltages. Devices such as cellular telephones and personal digital assistants typically receive their power from a supply battery. As the device operates, battery power is consumed and the battery voltage changes. Consequently, if the supply voltage is not regulated, the supply voltage and hence the performance of the device can also change over time.

DC-DC converters used to provide regulated voltage typically implement a fixed voltage gain stage and apply pulse frequency modulation (PFM) or pulse skipping techniques to regulate the voltage at the desired value. The power efficiency of such converters decreases as the voltage generated by the initial boost stage is increased beyond that necessary to provide the desired regulated output voltage. This occurs for example when it is necessary to provide a regulated output voltage of 4.5 volts from a 3.0 volt source and the initial boost stage doubles the input voltage. In this example, a boost gain of 1.5 is preferred unless and until the input voltage decreases to less than 3.0 volts.

SUMMARY OF THE INVENTION

A circuit and method for providing a regulated output voltage has been developed. The circuit includes a capacitor array that receives an input voltage and provides an output voltage across a load capacitor. The load capacitor is discharged by a device consuming power. The output voltage is regulated according to a control signal that modulates the amount of charge transferred from the capacitor array to the load capacitor. During the charge transfer, the output voltage is compared with a reference voltage and a control signal responsive to the comparison is generated to terminate the charge transfer to the load capacitor. Additionally, the capacitor array is able to switch between two or more gain states, depending on the input voltage, to achieve improved efficiency.

By providing the ability to dynamically configure the gain of the capacitor array, the present invention provides a power efficient method for generating a substantially constant output voltage for a wide range of input voltages. As a result, the battery life can be extended in portable electronic devices, such as cellular telephones and personal digital assistants.

In one embodiment of the invention, the circuit includes a capacitor array, a comparator and an output control module. The capacitor array includes a first array input terminal configured to receive a first control signal, a second array input terminal configured to receive a second control signal, a supply voltage terminal that receives a substantially DC voltage, and an array output terminal to provide the regulated output voltage. The capacitor array generates an intermediate signal in response to the first control signal and the substantially DC voltage. The capacitor array also generates the regulated output voltage at the array output terminal in response to the intermediate signal and the second control signal. The comparator includes a first comparator terminal in communication with the array output terminal and a comparator output terminal that provides a comparator signal in response to the regulated output voltage. The output control module includes a first control module input terminal in communication with the first array input terminal, a second control module input terminal in communication with the comparator output terminal, and a control module output terminal in communication with the second array input terminal. The output control module generates the second control signal at the control module output terminal in response to the comparator signal. In one embodiment, the comparator includes a second comparator terminal configured to receive a first reference voltage. The comparator generates the comparator signal in response to the output voltage and the reference voltage.

In one embodiment, the capacitor array is a switched capacitor array. In another embodiment, the invention includes a gain determination module. In this embodiment, the capacitor array includes a gain control terminal that receives a gain control signal. The gain determination module includes a first gain determination input terminal in communication with the supply voltage terminal and a gain determination output terminal in communication with the gain control terminal. The gain determination module generates the gain control signal in response to the substantially DC voltage. In one embodiment, the gain determination module includes a supply voltage comparator and a pump-switches configuration control module. The supply voltage comparator includes a first input terminal in communication with the first gain determination module input terminal and a supply comparator output terminal. The supply comparator generates a supply comparator signal at the supply comparator output terminal in response to the substantially DC input voltage. The pump-switches configuration control module includes a configuration input terminal in communication with the supply comparator output terminal and a configuration output terminal which is the gain determination module output terminal. The pump-switches configuration control module generates the gain control signal at the configuration output terminal in response to the supply comparator signal.

In one embodiment, the circuit includes a capacitor array, an error amplifier and an output control module. The capacitor array includes a first array input terminal configured to receive a first control signal, a second array input terminal configured to receive a second control signal, a supply voltage terminal configured to receive a substantially DC voltage, and an array output terminal to provide the regulated output voltage. The capacitor array generates an intermediate signal in response to the first control signal and the substantially DC voltage. The capacitor array also generates the regulated output voltage at the array output terminal in response to the intermediate signal and the second control signal. The error amplifier includes a first amplifier input terminal in communication with the array output terminal and an amplifier output terminal that provides an error signal in response to the regulated output voltage. The output control module includes a first control module input terminal in communication with the first array input terminal, a second control module input terminal in communication with the amplifier output terminal, and a control module output terminal in communication with the second array input terminal. The output control module generates the second control signal at the control module output terminal in response to the error signal and the first control signal.

In one embodiment, the error amplifier includes a second input terminal configured to receive a first reference voltage. The amplifier generates the error signal in response to the regulated output voltage and the reference voltage. In another embodiment, the circuit includes a filter. In this embodiment, the filter includes an input terminal in communication with the error amplifier output terminal, and a filter output terminal in communication with the second output control module input terminal. The filter generates a filtered error signal at its output terminal in response to the error signal. The output control module generates the second control signal in response to the first control signal and the filtered error signal. In another embodiment, the circuit includes a gain determination module. In this embodiment, the capacitor array includes a gain control terminal that receives a gain control signal. The gain determination module includes a first gain determination input terminal in communication with the supply voltage terminal, a second gain determination input configured to receive the regulated output voltage, a third gain determination input terminal configured to receive the error signal, and a gain determination output terminal in communication with the gain control terminal. The gain determination module generates the gain control signal in response to the substantially DC voltage, the regulated output voltage, and the error signal.

In one embodiment, the gain determination module includes a first comparator, a second comparator, and a gain setting module. The first comparator includes a first input terminal which is the second gain determination input terminal, and an output terminal. The first comparator generates a first gain change signal in response to the regulated output voltage. The second comparator includes a first input terminal which is the third gain determination input terminal, and an output terminal. The second comparator generates a second gain change signal in response to the error signal. The gain setting module includes a first input terminal which is the first gain determination input terminal, a second input terminal in communication with the first comparator output terminal, a third input terminal in communication with the second comparator output terminal, and an output terminal which is the gain determination output terminal. The gain setting module generates the gain control signal in response to the substantially DC voltage, the first gain change signal, and the second gain change signal.

In another aspect, the invention relates to a method for generating a regulated output voltage. The method includes the steps of charging a capacitor array in response to a first control signal thereby generating an intermediate signal, and controlling the intermediate signal in response to a second control signal, thereby generating the regulated output voltage. The method includes the additional step of generating the second control signal in response to the regulated output voltage. In another embodiment, the generating step includes comparing the regulated output voltage to a first reference voltage and generating the second control signal in response to the comparison.

In another embodiment, the capacitor array is a switched capacitor array and the method includes the step of switching the capacitor array from a first gain state to a second gain state in response to an array control signal. In another embodiment, the method includes the step of generating the array control signal in response to the array input voltage. In yet another embodiment, the method includes the step of comparing an input array voltage to a second reference voltage and generating the array control signal in response to the comparison.

Another embodiment of the invention provides a method for dynamically controlling the gain of a capacitor array. The method includes the steps of comparing an array output voltage to a first reference voltage and generating a first gain change signal in response to the comparison, and configuring the gain of the capacitor array in response to the gain change signal. The method also includes the steps of generating a differential signal in response to the output voltage and a second reference voltage, comparing the differential signal to a third reference voltage and generating a second gain change signal in response to the comparison, and configuring the gain of the capacitor array in response to the second gain change signal.

Another embodiment of the method for generating a regulated output voltage includes the steps of charging the capacitor array in response to the regulated output voltage, and transferring charge from the capacitor to a load for a predetermined time. In a further embodiment, the charging step includes generating a differential signal in response to the regulated output voltage and reference voltage, and terminating the charging of the capacitor in response to the differential signal.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DESCRIPTION OF THE PREFERRED EMBODIMENT

Figure 1:
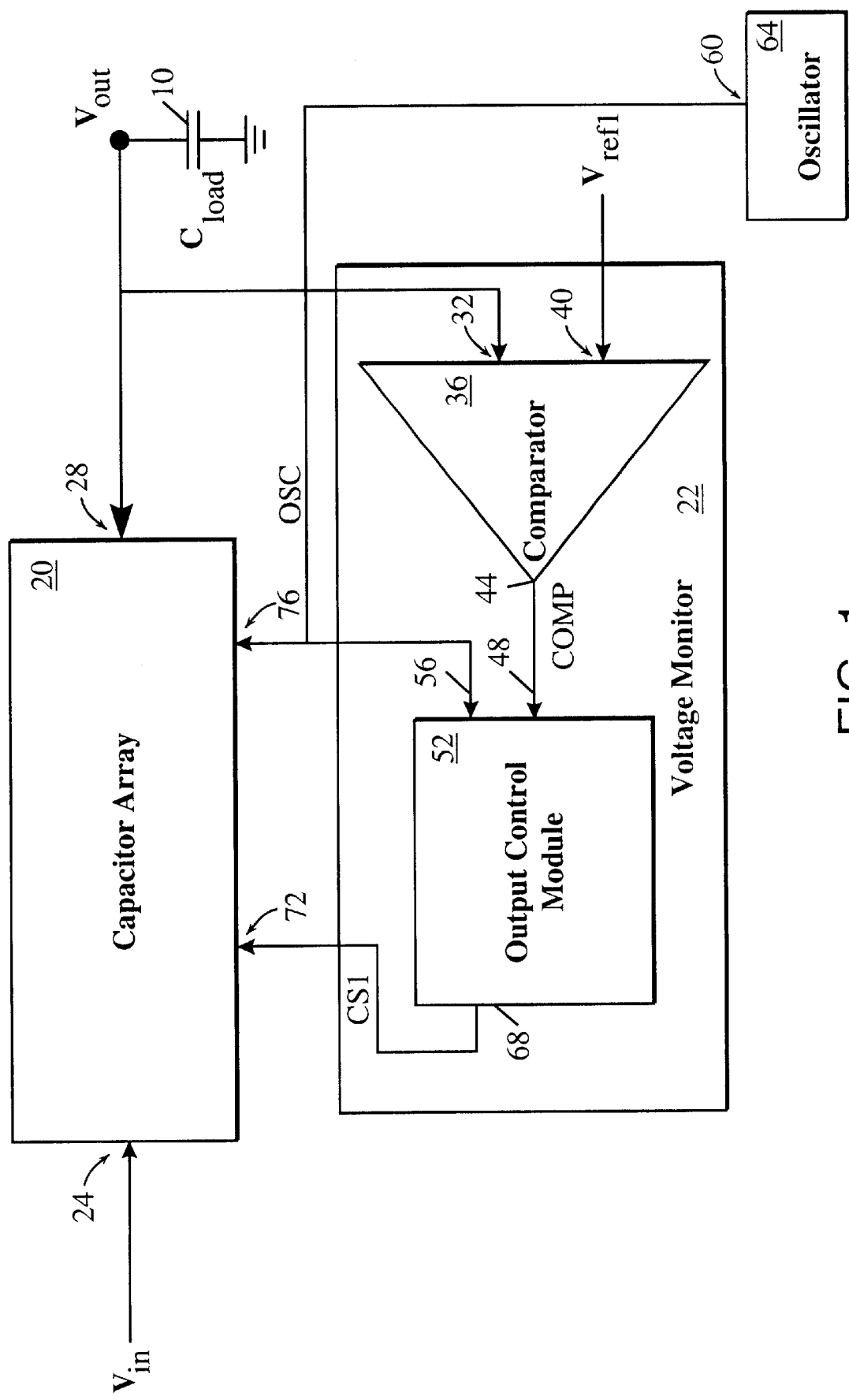
FIG. 1 is a block diagram of an embodiment of a regulated output voltage circuit in accordance with the present invention.

Referring to FIG. 1 in brief overview, an embodiment of a regulated voltage supply constructed in accordance with the invention includes a capacitor array 20, a voltage monitor 22, and an oscillator 64. The capacitor array 20 has a voltage input terminal 24 configured to receive an unregulated voltage Vin and a regulated output voltage terminal 28 to provide a regulated output voltage Vout. The voltage monitor 22 includes a comparator 36 and an output control module 52. The output voltage Vout is applied to one input terminal 32 of the comparator 36. The second comparator input terminal 40 is configured to receive a reference voltage Vref1. The comparator output terminal 44 provides a comparison signal COMP indicative of whether the output voltage Vout exceeds Vref1. The comparison signal COMP is supplied to a first input terminal 48 of the output control module 52. A second input terminal 56 of the output control module 52 is in communication with the output terminal 60 of the oscillator 64. The output terminal 68 of the output control module 52 provides a control signal CS1 to a control terminal 72 of the capacitor array 20. A second control terminal 76 of the capacitor array 20 is in communication with the output terminal 60 of oscillator 64.

In operation, the capacitor array 20 is charged by the input voltage Vin and supplies charge to load capacitor Cload 10 to generate the regulated output voltage Vout. The output voltage Vout is compared to the reference voltage Vref1 in comparator 36 and the resulting comparator signal COMP is applied to the output control module 52 along with oscillator signal OSC from oscillator 64. The output control module 52 generates control signal CS1 in response to received input signals COMP and OSC. Control signal CS1 is applied to the capacitor array 20 to control the pulse width (i.e., the duration) of the current supplied from the capacitor array 20 to the load capacitor Cload 10 thereby maintaining the output voltage Vout in regulation.

Figure 2:
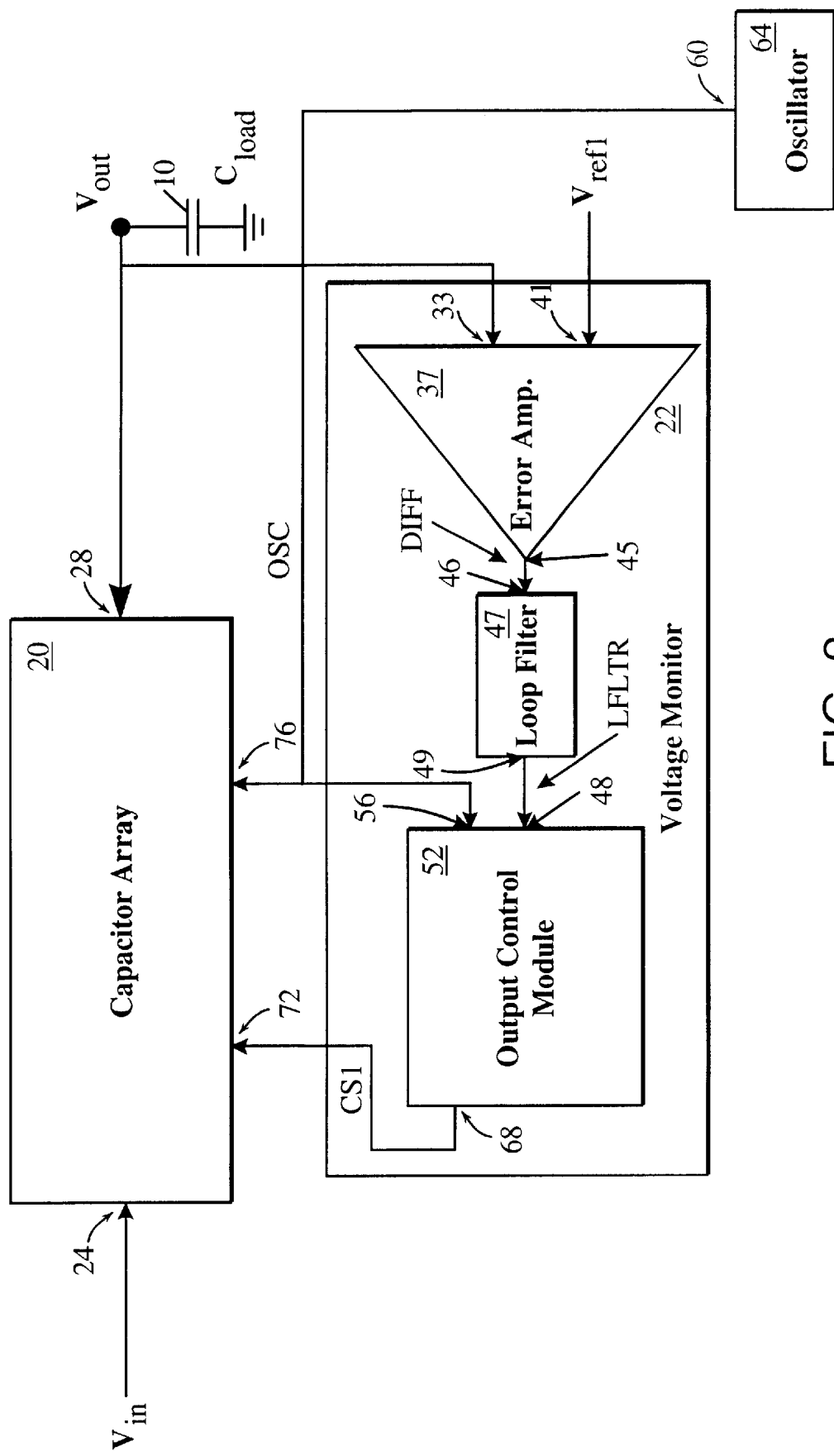
FIG. 2 is a block diagram of another embodiment of a regulated output voltage circuit constructed in accordance with the present invention.

Referring to FIG. 2, another embodiment of the voltage monitor 22 includes an error amplifier 37, an optional loop filter 47 and the output control module 52. The output voltage Vout is applied to one input terminal 33 of the error amplifier 37. The second error amplifier input terminal 41 is configured to receive a reference voltage Vref1. The error amplifier output terminal 45 is in communication with input terminal 46 of the loop filter 47. The loop filter output terminal 49 is in communication with the first input terminal 48 of the output control module 52. The second input terminal 56 of the output control module 52 is in communication with the output terminal 60 of the oscillator 64. The output terminal 68 of the output control module 52 is in communication with control terminal 72 of the capacitor array.

In operation, the capacitor array 20 is charged by the input voltage Vin and supplies charge to the load capacitor Cload 10 to generate the regulated output voltage Vout. Error amplifier 37 generates a differential signal DIFF substantially proportional to the difference between the output voltage Vout and the reference voltage Vref1. The differential signal DIFF is applied to loop filter 47. Loop filter 47 filters the differential signal DIFF to generate a time averaged signal LFLTR which is provided to the output control module 52. The output control module 52 generates control signal CS1, in response to input signals LFLTR and OSC. Control signal CS1 is applied to capacitor array 20 to control the pulse width (i.e., the duration) of the current supplied from the capacitor array 20 to the load capacitor Cload 10, thereby maintaining the output voltage Vout in regulation.

In some instances it may be desirable to control the gain of the capacitor array 20 that boosts the input voltage. For example, if the desired output voltage Vout is 5.0 V, and the input voltage source (e.g., battery) provides a voltage Vin greater than 3.3 V, then a first gain $G_1$ of 1.5 enables generation of the required output voltage Vout of 5.0 V for small loads. However, if the input voltage Vin drops below 3.3 V, a second gain $G_2$ (greater than the first gain $G_1$) is required in order to generate the required output voltage Vout. In this example, a second gain $G_2$ of 2 enables the circuit to supply the desired output voltage Vout for an input voltage Vin of at least 2.5 V. Although the second gain $G_2$ can be used if the input voltage exceeds 3.3 V, it is desirable to use the first gain voltage $G_1$ because the resulting power efficiency is greater. Thus, providing a dynamically configurable gain capability allows the circuit to achieve longer useful battery lifetimes.

Figure 3:
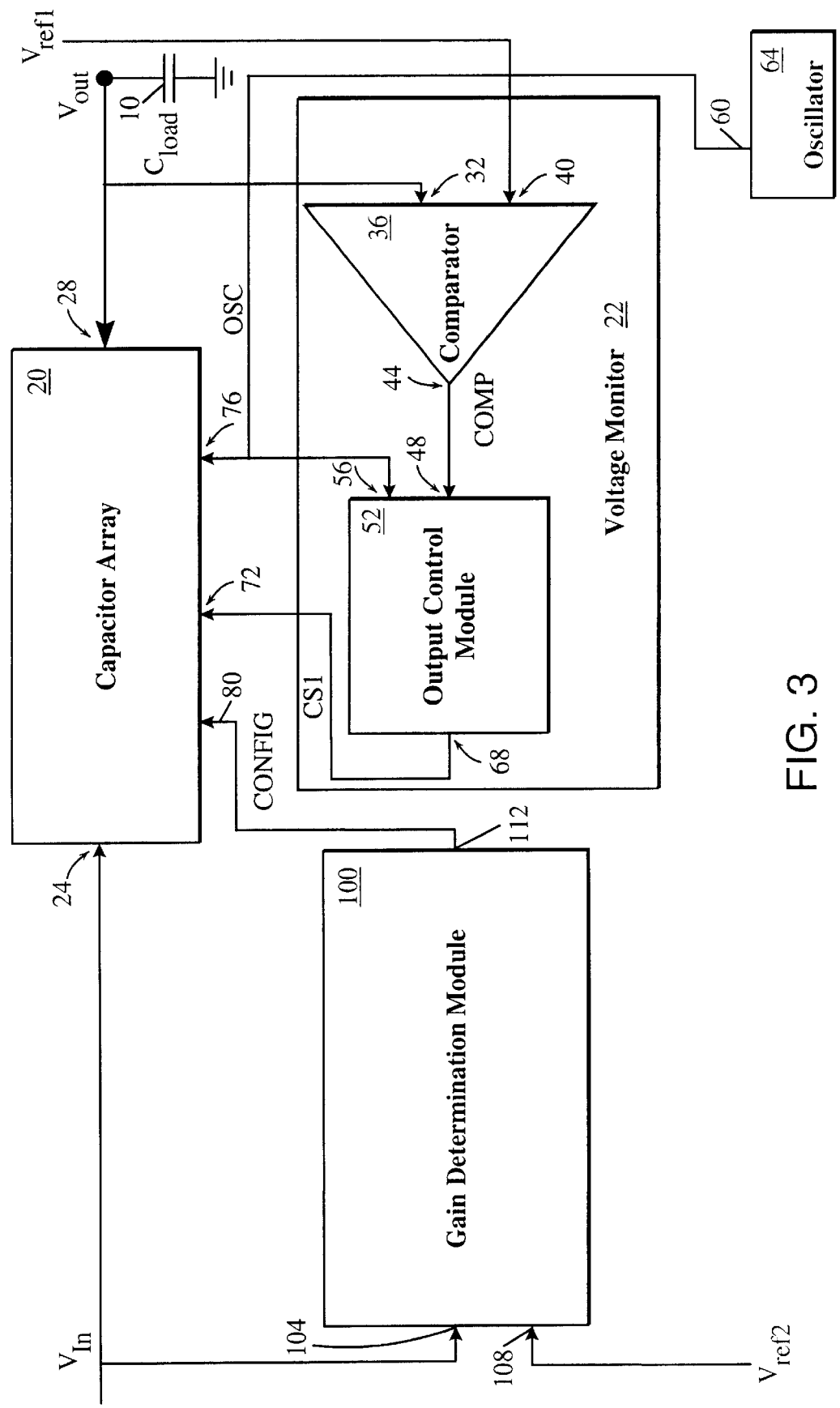
FIG. 3 is a block diagram of another embodiment of a regulated output voltage circuit constructed in accordance with the present invention.

Referring to FIG. 3, in one embodiment a gain determination module 100 is used to control the gain of the capacitor array 20. A first gain determination module input terminal 104 is configured to receive the unregulated supply voltage Vin. A second gain determination module input terminal 108 is configured to receive a second reference voltage Vref2. The gain determination module 100 generates at its output terminal 112 a gain configuration signal CONFIG. The gain configuration signal CONFIG is provided to a third control terminal 80 of the capacitor array 20 to control its gain dynamically.

Figure 4:
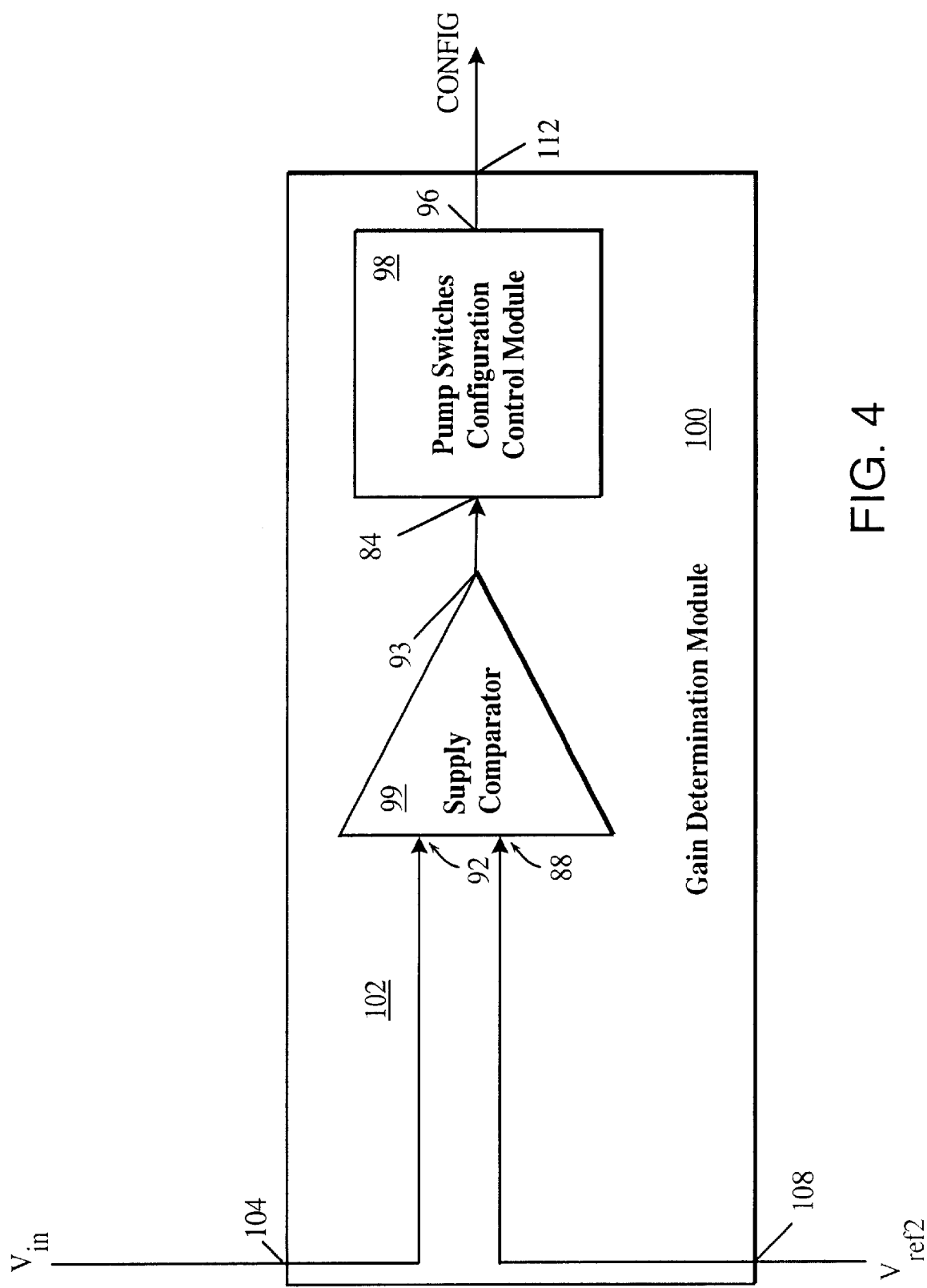
FIG. 4 is a block diagram showing in more detail an embodiment of the gain determination module disclosed in FIG. 3.

Referring to FIG. 4, in greater detail the gain determination module 100 includes a supply comparator 99 and a pump-switches configuration control module 98. The supply comparator 99 has a first input terminal 92 which is the first gain determination module input terminal 104, a second input terminal 88 which is the second gain determination module input terminal 108, and an output terminal 93. The pump-switches configuration control module 98 has an input terminal 84 in communication with the supply comparator output terminal 93 and has an output terminal 96 which is the gain determination module output terminal 112.

In operation, the unregulated input voltage Vin received at the first gain determination module input terminal 104 is compared to the second reference voltage Vref2 by the supply comparator 99. If input voltage Vin is greater than Vref2, the gain determination module 100 asserts a first state of the gain configuration signal CONFIG. In response, capacitor array 20 is configured to provide a first gain $G_1$. Alternatively, if the input voltage Vin does not exceed the second reference voltage Vref2, the gain determination module 100 asserts a second state of the gain configuration signal CONFIG. As a result, capacitor array 20 is configured to provide a second gain $G_2$.

In one embodiment, the gain determination module includes a windowing module (not shown) in place of the supply comparator 99. The windowing module generates a signal indicative of which one of multiple voltage ranges includes the input voltage Vin. A corresponding voltage gain is established in the capacitor array 20. The multiple gain selectivity feature results in further improvement to the power conversion efficiency of the circuit and further extends the battery lifetime.

In one embodiment, Vref1 is generated by a bandgap reference circuit. In one embodiment, Vref2 is generated by a bandgap reference circuit. In one embodiment, the reference voltages Vref1 and Vref2 are equal. In another embodiment, a scaled voltage representation of the output voltage Vout is generated by a voltage divider circuit (not shown) and supplied to comparator 36 of the voltage monitor 22. Similarly, a voltage divider circuit can be used to generate a scaled voltage representation of the unregulated input voltage Vin and is communicated to the supply comparator 99.

Figure 5:
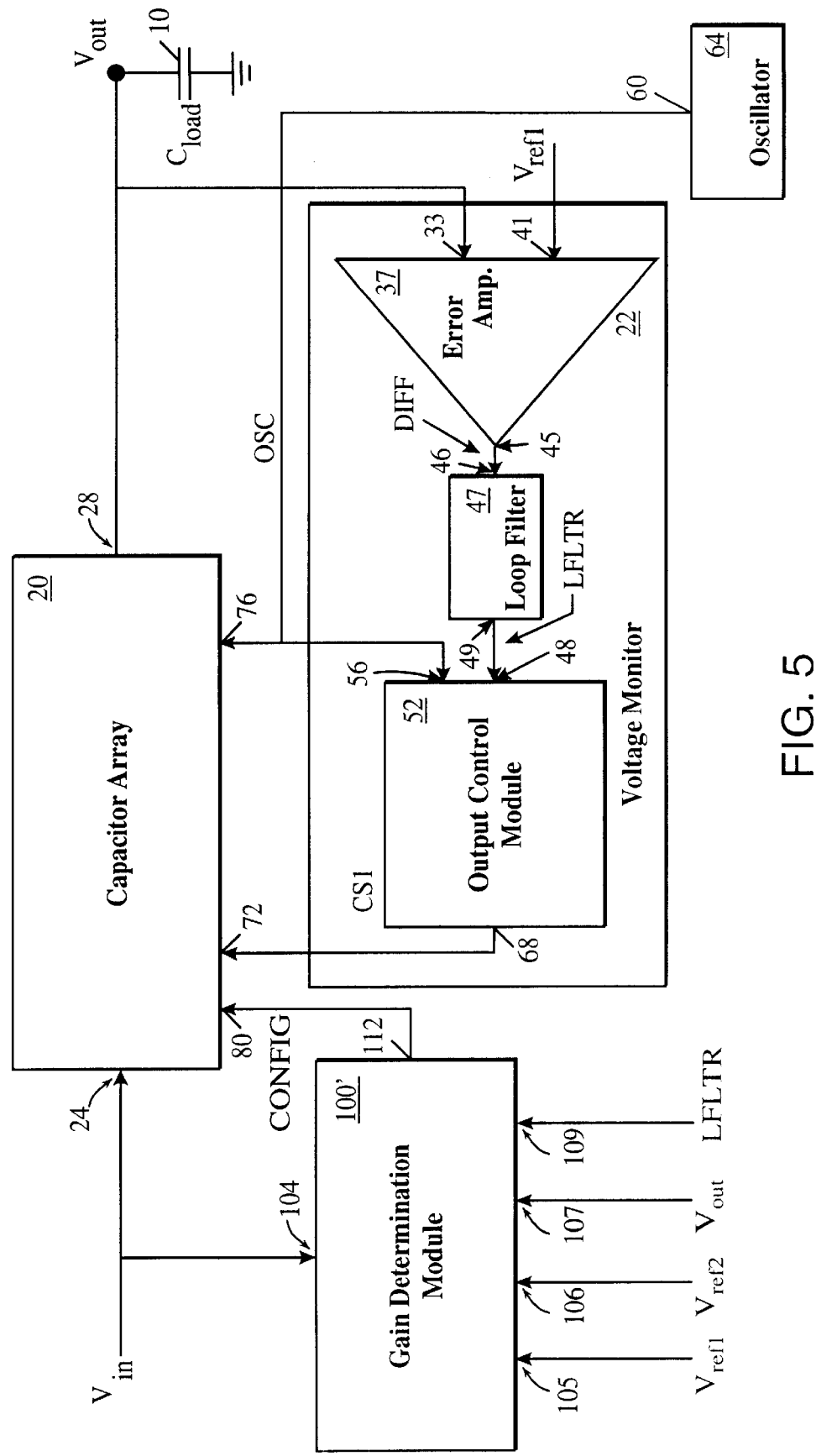
FIG. 5 is a block diagram of another embodiment of a regulated output voltage circuit constructed in accordance with the present invention.

Referring to FIG. 5, in one embodiment the gain determination module 100' is used to control the gain of capacitor array 20. The gain determination module 100' includes a first input terminal 104 configured to receive the unregulated supply voltage Vin, a second input terminal 105 configured to receive a first reference voltage Vref1, a third input terminal 106 configured to receive a second reference voltage Vref2, a fourth input terminal 107 configured to receive the regulated output voltage Vout, and a fifth input terminal 109 configured to receive the time average signal LFLTR. The gain determination module 100' generates a gain configuration signal CONFIG at its output terminal 112.

In operation, the regulated output voltage Vout is applied to input terminal 107, the second reference voltage Vref2 is received at input terminal 106, the first reference voltage Vref1 is received at input terminal 105, the time average signal LFLTR is received at input terminal 109, and the unregulated supply voltage Vin is received input terminal 104. In response to input signals Vin, Vout, LFLTR, Vref1 and Vref2, the gain determination module 100 generates the gain configuration signal CONFIG at its output terminal 112 and provides the gain configuration signal CONFIG to the third control signal input 80 of the capacitor array 20. In response to the gain configuration signal CONFIG the capacitor array 20 is configured to operate at the appropriate gain.

Figure 6:
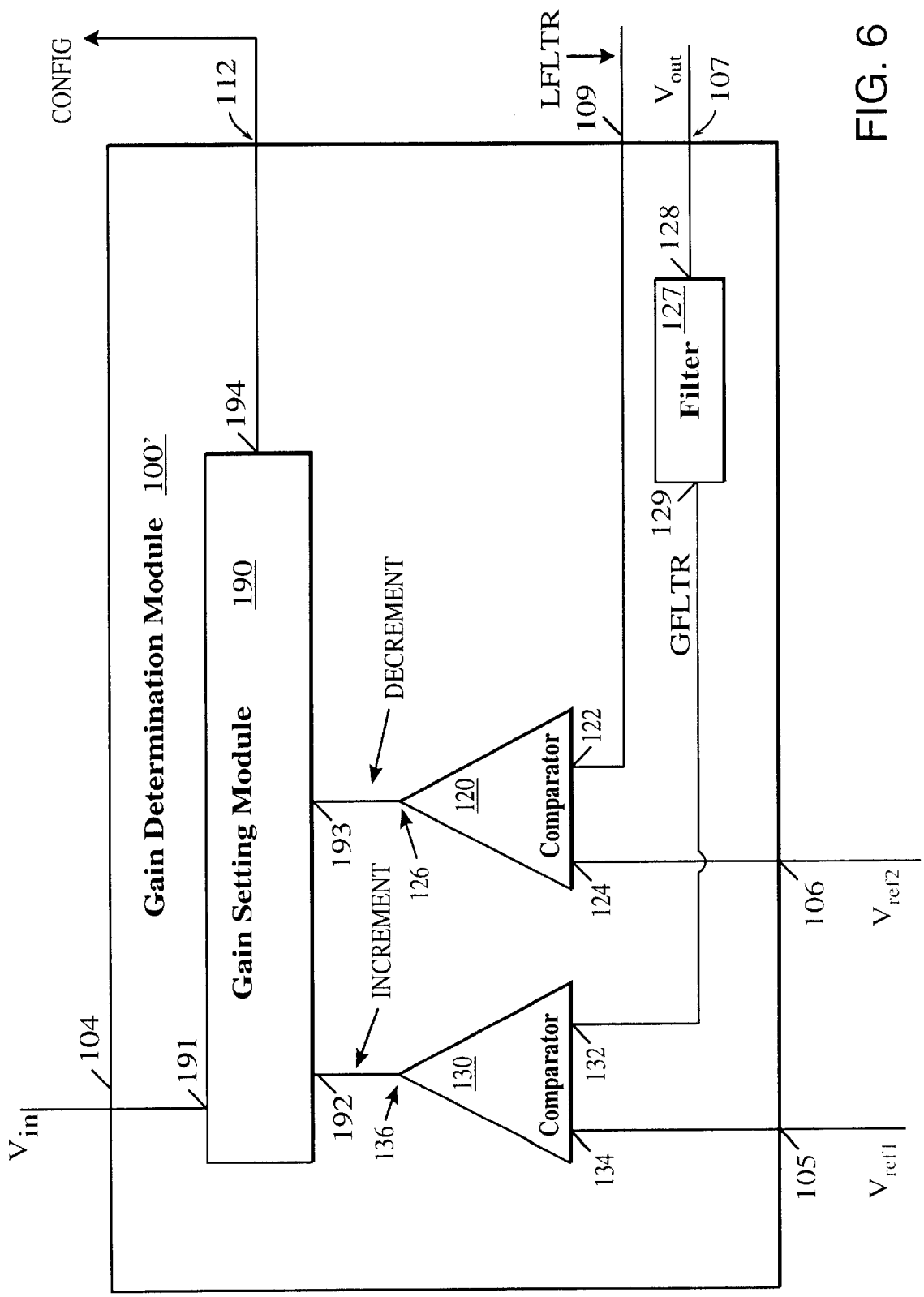
FIG. 6 is a block diagram showing in more detail an embodiment of the gain determination module disclosed in FIG. 5.

Referring to FIG. 6, in greater detail the gain determination module 100' includes an increment comparator 130, a decrement comparator 120, a gain setting module 190, and an optional filter 127. The filter 127 has an input terminal 128 that is the gain determination module input terminal 107, and an output terminal 129. The increment comparator 130 has first input terminal 134 which is the gain determination module input terminal 105, a second input terminal 132 in communication with the filter output terminal 129, and an increment comparator output terminal 136. The decrement comparator 120 has a first input terminal 124 which is the gain determination module input terminal 106, a second input terminal 122 which is the gain determination module input terminal 109, and a decrement comparator output terminal 126. The gain setting module 190 has a first input terminal 191 which is the gain determination module input terminal 104, a second input terminal 192 in communication with the increment comparator output terminal 136, a third input terminal 193 in communication with the decrement comparator output terminal 126, and an output terminal 194 which is the gain determination module output terminal 112.

In operation, filter input terminal 128 receives the regulated output voltage Vout and generates a time average signal GFLTR at its output terminal 129. Increment comparator 130 receives the time average signal and generates gain increment signal INCREMENT at its output terminal 136 in response. Decrement comparator 120 receives the time average signal LFTLR at input terminal 122 and the second reference voltage Vref2 at input terminal 124, and generates decrement signal DECREMENT at its output terminal 126 in response. The gain setting module 190 receives the unregulated reference voltage Vin at input terminal 104, the gain increment signal INCREMENT at input terminal 192, and the gain decrement signal DECREMENT at input terminal 193. In response, the gain setting module 190 generates the gain configuration signal CONFIG at output terminal 194 which is the gain determination module output terminal 112. The third control signal input terminal 80 of capacitor array 20 receives the gain configuration signal CONFIG and is configured to operate at the corresponding gain.

In one embodiment (not shown), the gain determination module 100 provides a plurality of gain configuration signals CONFIG', CONFIG'', CONFIG''' (generally CONFIG) at its output terminal 112 to the third control input terminal 80 of the capacitor array 20. A first gain configuration signal CONFIG' is generated in response to Vin and provided to capacitor 20. The capacitor 20 is configured to an initial gain state G1. During operation, the gain determination module 100' generates the additional gain configuration signals CONFIG'' and CONFIG''' in response to received signals INCREMENT and DECREMENT. Gain configuration signals CONFIG'' and CONFIG''' are provided to the capacitor 20 and in response the gain of capacitor array 20 is either incremented or decremented to a new gain state G2 thereby providing an increased power efficiency relative to initial gain state G1.

Figure 7:
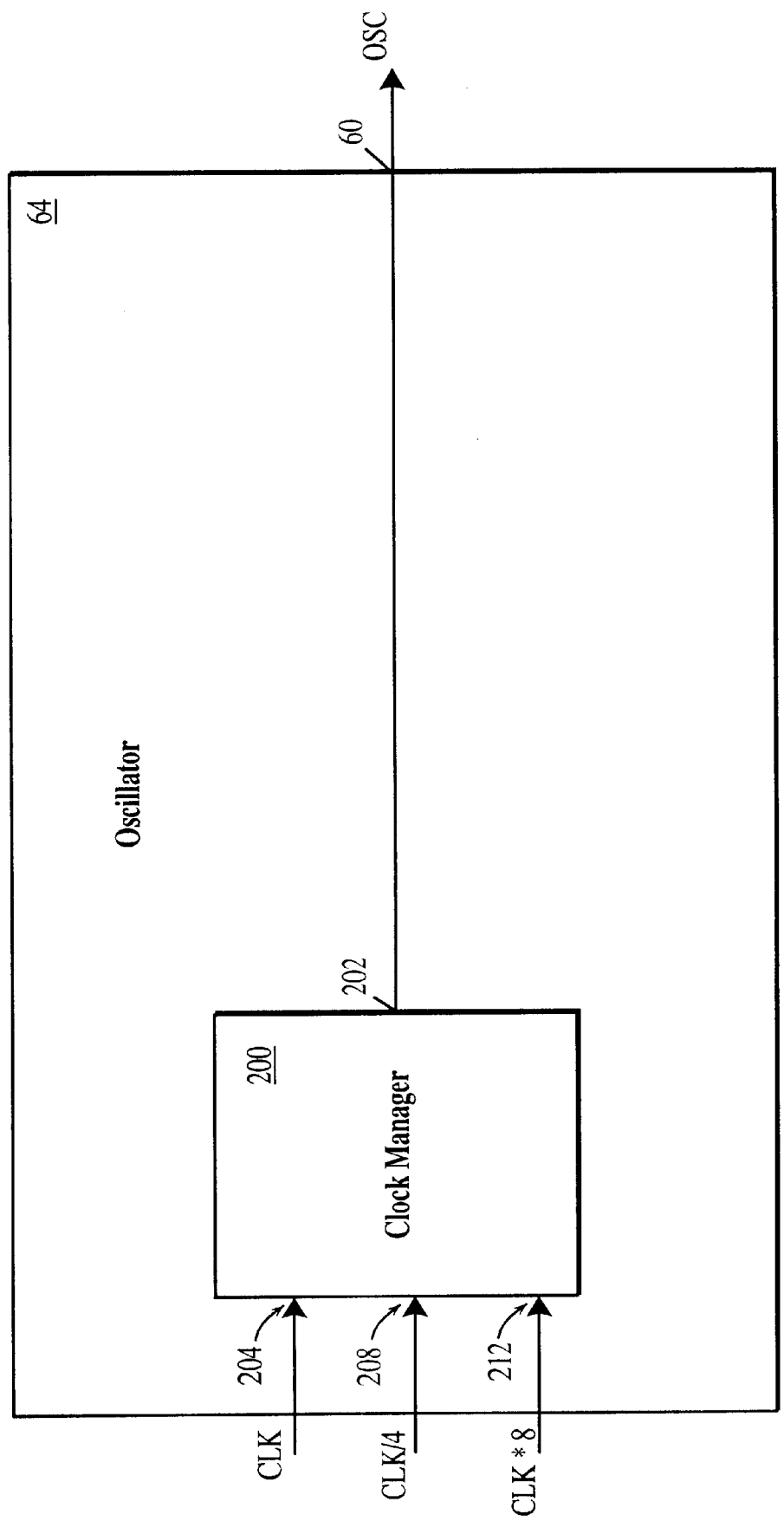
FIG. 7 is a block diagram showing in more detail an embodiment of the oscillator circuit disclosed in FIG. 3.

Referring to FIG. 7, in more detail the oscillator 64 includes a clock manager 200. The clock manager 200 has a first input terminal 204, a second input terminal 208, a third input terminal 212, and an output terminal 202. The output terminal 202 is the oscillator output terminal 60 and provides the oscillator signal OSC. During operation, the clock manager 200 receives an input clock signal CLK of substantially fixed frequency $f_{clk}$ at terminal 204. Input terminals 208 and 212 accepts logic signals CLK/4 and CLK*8 indicative of the desired frequency, $f_{osc}$ of the oscillator signal OSC, to the clock manager 200. In response to logic signals, CLK/4 and CLK*8, the oscillator frequency $f_{osc}$ is unchanged, increased by a factor of 8, or decreased by a factor of ¼. These logic signals CLK/4 and CLK*8 are generally determined by known circuit parameters (e.g. load value) and provided by the user externally. In one embodiment, the clock manager 200 monitors the output voltage Vout to internally determine the optimum oscillator frequency $f_{osc}$. In this case the user would not need to externally control the clock frequency. In another embodiment, the clock is generated internally and is not synchronized or locked to a user supplied clock, thus eliminating the need for an additional I/O pin.

Figure 8:
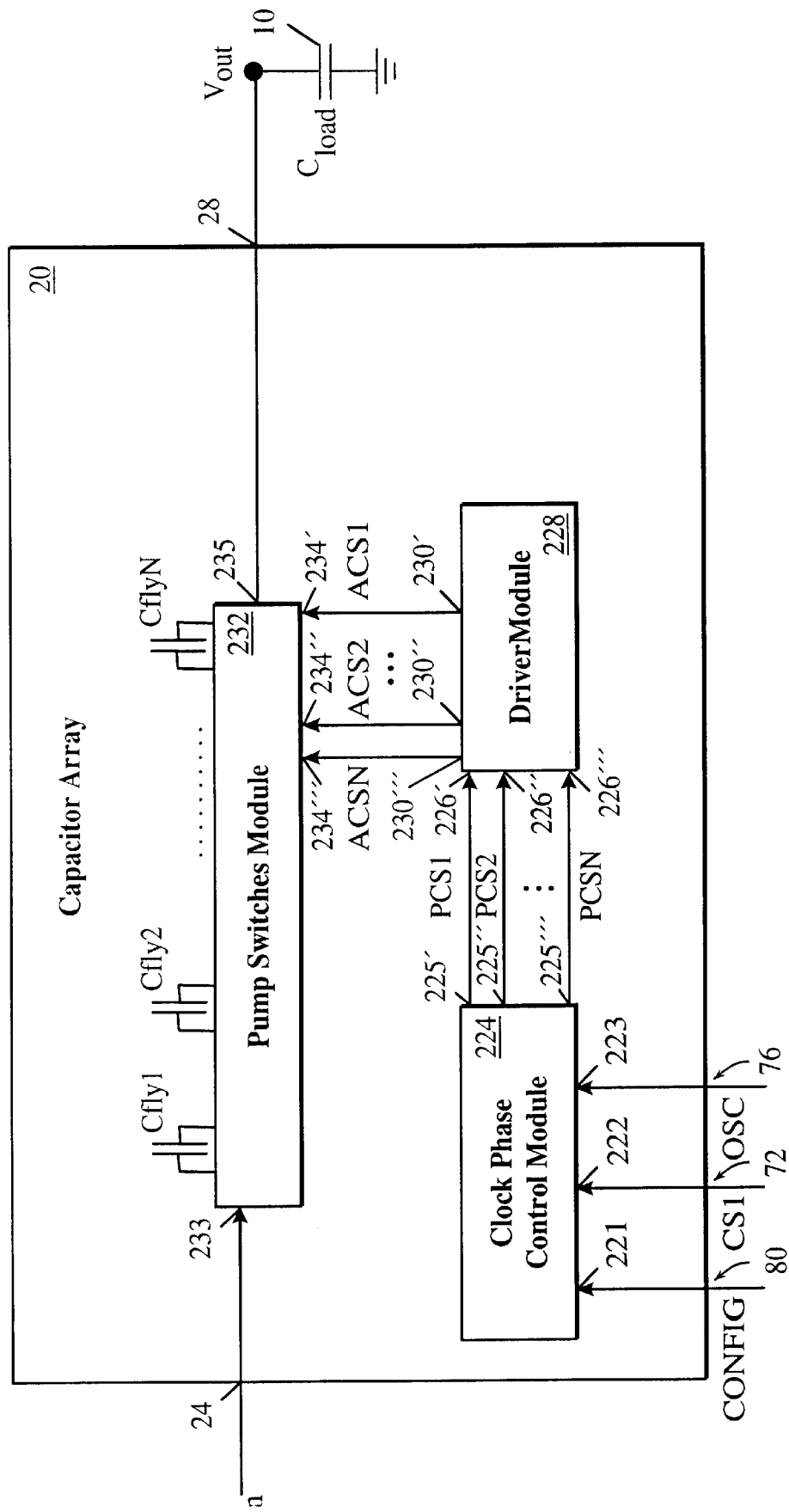
FIG. 8 is a block diagram showing in more detail an embodiment of the capacitor array circuit disclosed in FIG. 3.

Referring to FIG. 8, the capacitor array 20 includes a clock phase control module 224, a driver module 228, multiple fly capacitors Cfly1 . . . CflyN, and a pump-switches module 232. The clock phase control module 224 has an input terminal 221 which is the capacitor array input terminal 80, a second input terminal 222 which is the capacitor array input terminal 72, a third input terminal 223 which is the capacitor array input terminal 76, and terminals 225', 225'', 225''' (generally 225) for providing phase adjusted control signals PCS1, PCS2, PCSN (generally PCS) to the input terminals 226', 226'', 226''' (generally 226) of the driver module 228. The driver module 228 includes output terminals 230', 230'', 230''' (generally 230) for providing low impedance control signals ACS1, ACS2, ACSN (generally ACS) capable of driving the switches in the pump-switches module 232. The pump-switches module 232 includes a supply voltage input terminal 233 which is the capacitor array input terminal 24, input terminals 234', 234", 234‴ (generally 234) to receive amplified controls signals ACS1, ACS2, ACSN respectively, and an output terminal 235 which is the capacitor array output terminal 28.

In operation, the clock phase control module 224 generates the phase adjusted control signals PCS in response to the CONFIG, CS1 and OSC signals. The driver module 228 generates the low impedance control signals ACS from the phase adjusted control signals PCS. The pump-switches module 232 is configured to a certain gain state in response to the amplified control signals ACS and generates the output voltage Vout across load capacitor Cload 10. As the control signal CS1 and the configuration signal CONFIG change in response to the output voltage Vout and input voltage Vin, respectively, the phase adjusted control signals PCS change so that the pump-switches module 232 maintains the output voltage Vout in regulation.

Figure 9:
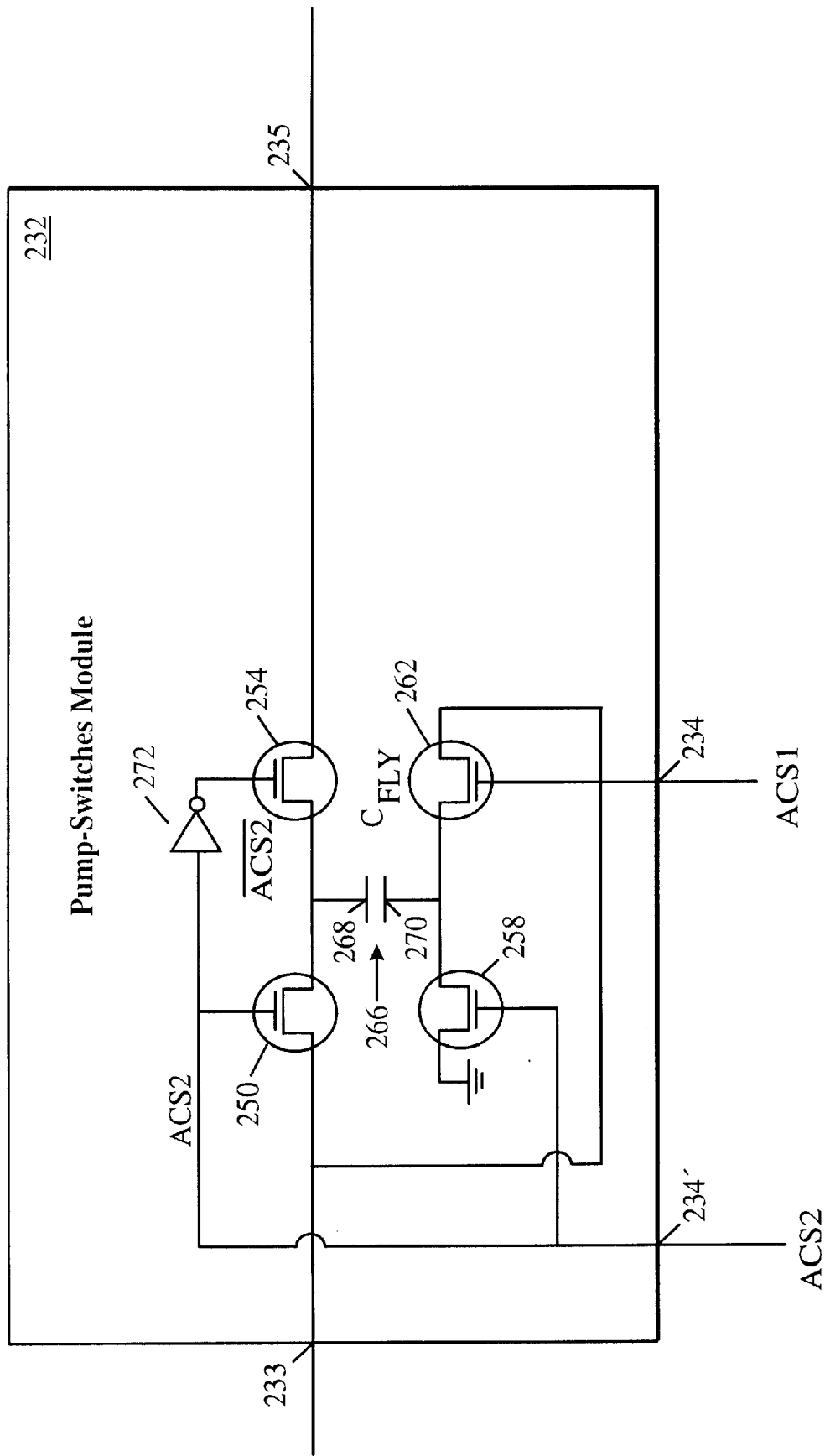
FIG. 9 is a schematic diagram showing in more detail an embodiment of the pump-switches module disclosed in FIG. 8.

Referring to FIG. 9, in one embodiment, the pump-switches module 232 includes four switches 250, 254, 258, 262 and a single fly capacitor Cfly 266. Hence this module contains only one gain state. Additional fly capacitors are required to achieve multiple gain states as previously discussed. However, this single gain state example is useful to illustrate how the output is regulated using the pulse width modulation control. The switches 250, 254, 258, 262 can be metal oxide semiconductor field effect transistors (MOSFETs) or other devices capable of controlling the charge transferred to and from the fly capacitor Cfly 266. Switch 250 controls the flow of current from source Vin through input terminal 233 to terminal 268 of fly capacitor Cfly 266 in response to low impedance control signal ACS2. Switch 258 controls the flow of current from terminal 270 of fly capacitor Cfly 266 to ground in response to low impedance control signal ACS2. Low impedance control signal ACS2 is inverted to $\overline{ACS2}$ by inverter 272 and used to operate switch 254 to control the flow of current from terminal 268 of fly capacitor Cfly 266 to output terminal 235. Switch 262 controls the flow of current between input terminal 233 and terminal 270 of fly capacitor Cfly 266, in response to low impedance control signal ACS1. The load (not shown) generates a load current that discharges the load capacitor Cload 10. As discussed above, the charge on the load capacitor Cload 10 is refreshed periodically by the fly capacitor Cfly 266.

In operation, for the first half of a clock cycle of period T, switches 250 and 258 are closed, and switches 254 and 262 are open in response to the low impedance control signals ACS. In this configuration, fly capacitor Cfly 266 is charged approximately to voltage Vin in response to the unregulated input voltage Vin applied to input terminal 233. At the start of the second half of period T, switches 250 and 258 transition to an open, and switches 254 and 262 transition to the closed state in response to a change in the low impedance control signals ACS. Consequently, the voltage at terminal 270 of fly capacitor Cfly 266 increases to the input voltage Vin and the voltage at terminal 268 of fly capacitor Cfly 266 increases to approximately twice the supply voltage Vin. Subsequently, fly capacitor Cfly 266 transfers charge to the load capacitor Cload 10 through the pump-switches module output terminal 235. When the voltage across Cload 10 (Vout) approaches the regulated value (e.g. Vref1), low impedance control signal ACS1 opens switch 262 via the output control module 52 discussed earlier, thereby producing the pulse width modulated control. If the output voltage Vout never increases to match the regulated value (for example under heavy load conditions), then switch 262 remains closed for the full second half of period T. At the conclusion of period T, switch 254 is opened and switch 262 is also opened (if not already open), thus terminating the charge transfer to load capacitor Cload 10 until the next clock cycle.

Figure 10:
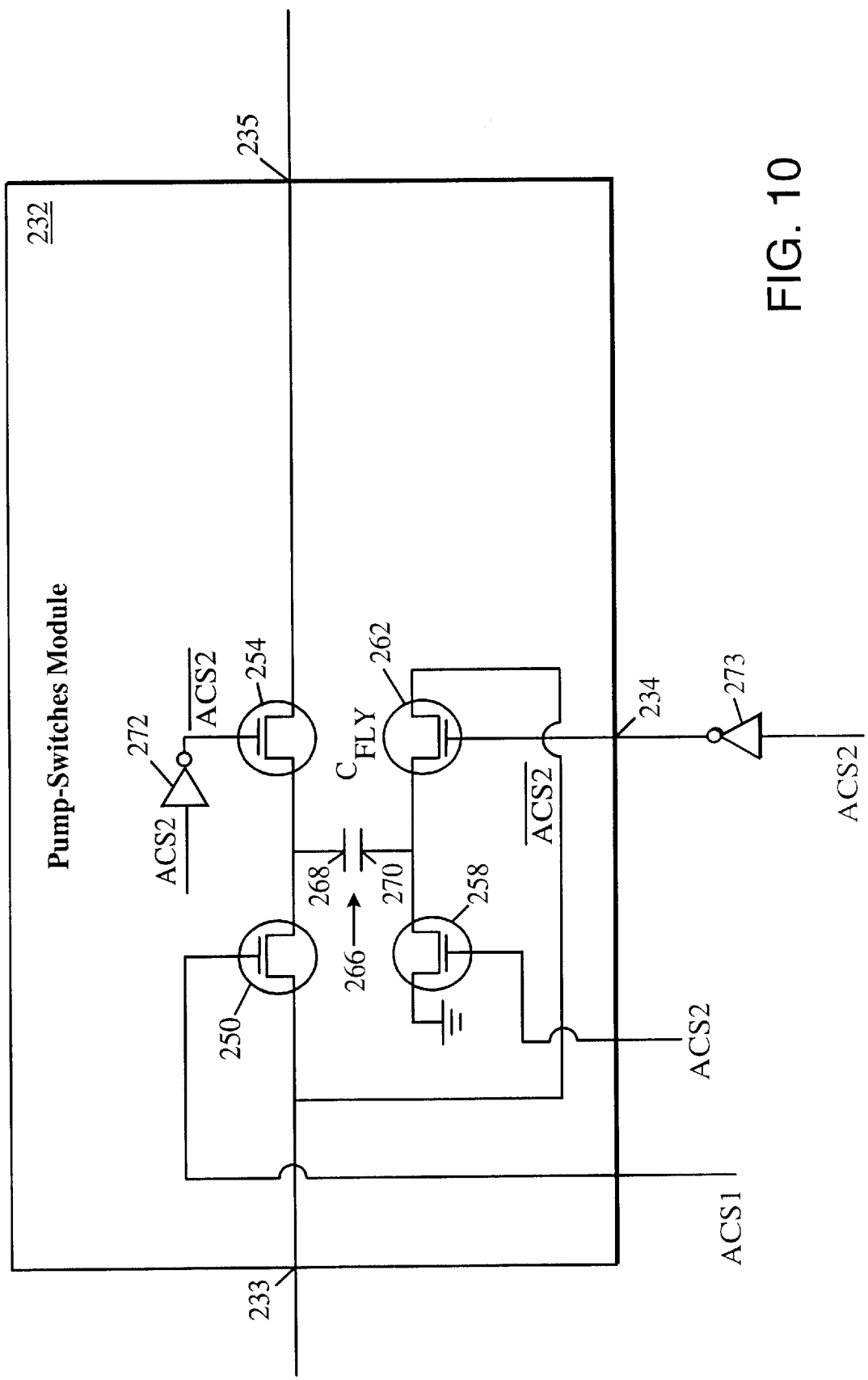
FIG. 10 is a schematic diagram showing in more detail an embodiment of the pump-switches module disclosed in FIG. 8.

Referring to FIG. 10, in one embodiment the pump-switch module 232, switch 250 controls the flow of current from input terminal 233 to terminal 268 of fly capacitor Cfly 266 in response to low impedance control signal ACS1. Switch 258 controls the flow of current from terminal 270 of fly capacitor Cfly 266 to ground in response to low impedance control signal ACS2. Low impedance control signal ACS2 is inverted by inverter 272 or 273 to generate low impedance control signal $\overline{ACS2}$. The inverted control signal $\overline{ACS2}$ is used to operate switch 254 to control the flow of current from terminal 268 of fly capacitor Cfly 266 to output terminal 235. Inverted control signal $\overline{ACS2}$ is also used to operate 262 to control the flow of current between input terminal 233 and terminal 270 of fly capacitor Cfly 266. The load (not shown) receives a load current that discharges the load capacitor Cload 10. As previously discussed, the charge on the load capacitor Cload 10 is refreshed periodically by the fly capacitor Cfly 266.

In operation, for a portion of the first half of a clock cycle of period T, switches 250 and 258 are closed, and switches 254 and 262 are open in response to the low impedance control signals ACS1 and ACS2. Consequently, fly capacitor Cfly 266 begins charging to the unregulated input voltage Vin applied to input terminal 233. In this embodiment the charging time of fly capacitor Cfly 266 is pulse width modulated based on the magnitude of the load across to load capacitor Cload 10. For heavy loads, the charge time can reach a maximum of one half the clock cycle and the fly capacitor Cfly 266 is charged to approximately the input voltage Vin. For lighter loads, the charge time is terminated before the end of the first half of the clock cycle in response to low impedance control signals ACS, so that fly capacitor Cfly 266 is neither charging or discharging during a portion of the clock cycle. During the second half of period T, switches 250 and 258 transition to an open state and switches 254 and 262 transition to the closed state in response to low impedance control signals ACS. Consequently, the voltage at terminal 270 of fly capacitor Cfly 266 increases to the input voltage Vin and the voltage at terminal 268 of fly capacitor Cfly 266 increases to a value substantially equal to the sum of Vin and the voltage across fly capacitor Cfly 266. Fly capacitor Cfly 266 transfers charge to the load capacitor Cload 10 through the pump-switches module output terminal 235 for the second half of the clock cycle.

Figure 11:
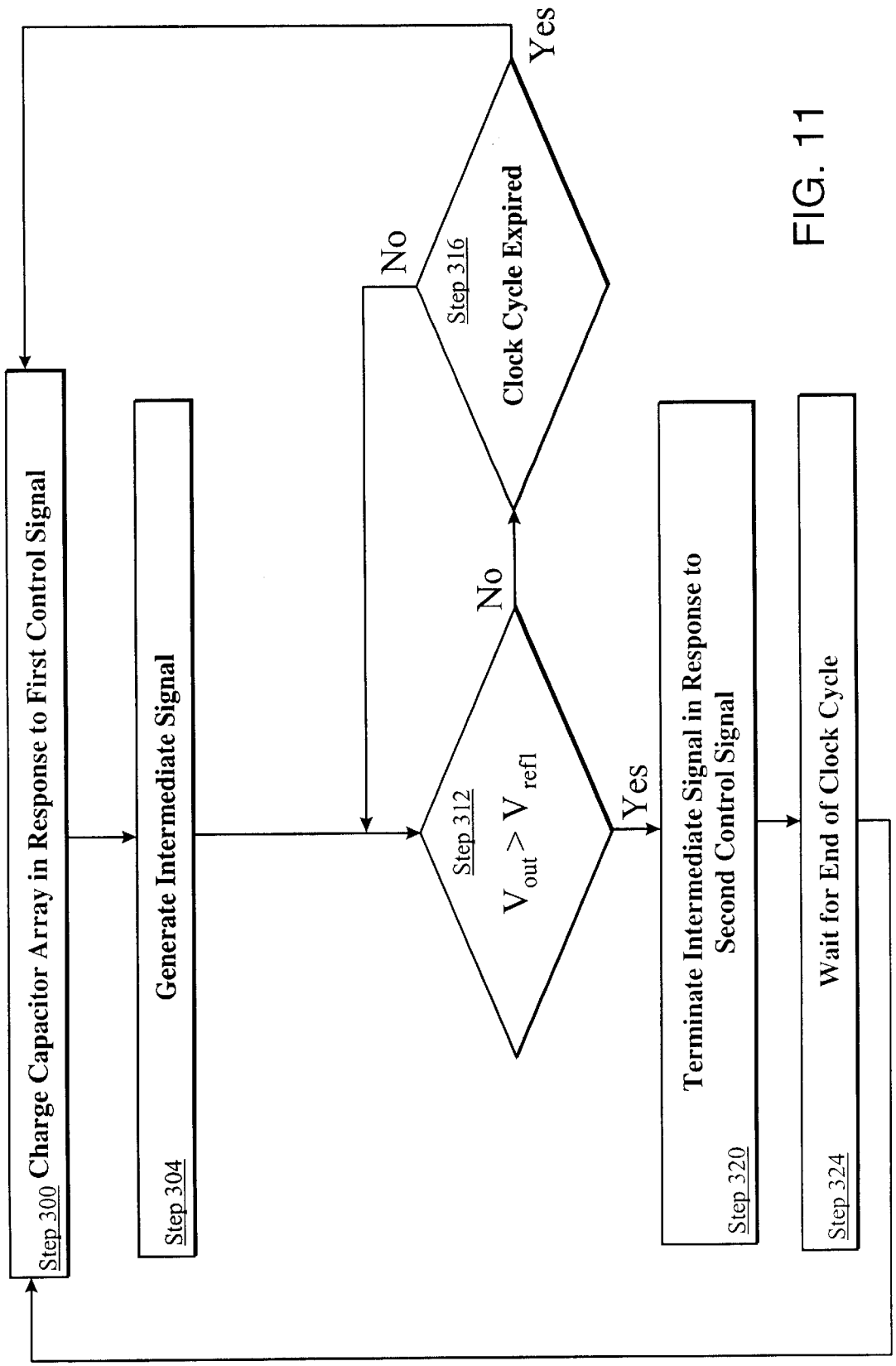
FIG. 11 is a flowchart representation of an embodiment of a method for providing a regulated output voltage in accordance with the present invention.

Referring to FIG. 11, in one embodiment the invention includes a method for generating a regulated output voltage. In step 300, a capacitor array 20 is charged in response to a first control signal. In step 304, an intermediate signal is generated by the charged capacitor array 20. In one embodiment, the intermediate signal is periodic and has an on time that does not exceed its off time. In step 312, the regulated output voltage not is compared to a first reference voltage Vref1. If Vout does riot exceed Vref1, a determination as to whether the end of the clock cycle has occurred is determined in step 316. The charging of the load capacitor Cload 10 continues if time remains in the clock cycle, otherwise the method returns to step 300. If Vout exceeds Vref1 at step 312, the intermediate signal is terminated in response to the second control signal in step 320 thereby terminating the charge transfer to load capacitor Cload 10. In this sense the second control signal is pulse width modulated to regulate the output voltage. For heavy loads the second control signal remains asserted for a longer time than for light loads because more time is required to charge up load capacitor Cload 10. In step 324, once the transfer of charge to load capacitor Cload 10 terminates, the method waits for the clock cycle to end before again charging the capacitor array 20 at the start of the next clock cycle in step 300.

While the invention has been particularly shown and described with reference to specific preferred embodiments, it should be understood by those skilled in the art that various changes in form and detail may be made therein without departing from the spirit and scope of the invention as defined by the appended claims.

I claim:

1. A method for generating a regulated output voltage, the method comprising the steps of:
    charging a capacitor array for substantially a first half of a period of a charge cycle in response to a first control signal thereby generating an intermediate signal;
    controlling said intermediate signal in response to a second control signal thereby generating said regulated output voltage;
    generating said second control signal in response to said regulated output voltage;
    generating an array control signal in response to an array input voltage to thereby control the gain of the capacitor array; and
    transferring charge from said capacitor array in response to said intermediate signal for a variable portion of a second half of a period of said charge cycle.

2. The method of claim 1 wherein the generating step further comprises comparing said regulated output voltage to a first reference voltage and generating said second control signal in response thereto.

3. The method of claim 1 wherein the capacitor array is a switched capacitor array and the method further comprises the step of switching said switch capacitor array from a first gain state to a second gain state in response to said array control signal.

4. The method of claim 1 wherein said step of generating said array control signal comprises comparing said array input voltage to a second reference voltage and generating said array control signal in response thereto.

5. The method of claim 2 wherein said intermediate signal has an on time and an off time and wherein said step of controlling comprises terminating said on time of said intermediate signal if said regulated output voltage exceeds said first reference voltage.

6. A method for generating a regulated output voltage, the method comprising the steps of:
    charging a capacitor array in response to a first control signal thereby generating an intermediate signal, said intermediate signal having a variable on time and a variable off time;
    terminating said on time of said intermediate signal in response to a second control signal, thereby generating said regulated output voltage;
    generating said second control signal in response to said regulated output voltage; and
    generating an array control signal in response to an array input voltage to thereby control the gain of the capacitor array.

7. The method of claim 6 wherein said generating step comprises comparing said regulated output voltage to a reference voltage and generating said second control signal in response thereto.

8. A method for generating a regulated output voltage, the method comprising the steps of:
    charging a capacitor array for substantially half a period of a charge cycle in response to a first control signal;
    generating an intermediate signal within said charged capacitor array;
    generating a second control signal in response to said regulated output voltage;
    terminating said intermediate signal in response to said second control signal thereby controlling said regulated output voltage;
    generating an array control signal in response to an array input voltage to thereby control the gain of the capacitor array; and
    transferring charge from said capacitor array in response to said intermediate signal for a variable portion of a second half of a period of said charge cycle.

9. The method of claim 8 wherein the step of generating a second control signal comprises comparing said regulated output voltage to a reference voltage and generating said second control signal in response thereto.

10. A circuit for generating a regulated output voltage comprising:
    a capacitor array comprising a first array input terminal configured to receive a first control signal, a second array input terminal configured to receive a second control signal, a supply voltage terminal configured to receive a substantially DC voltage, and an array output terminal for providing said regulated output voltage, said capacitor array generating an intermediate signal in response to said first control signal and said substantially DC voltage, said capacitor array generating said regulated output voltage at said array output terminal in response to said intermediate signal and said second control signal;
    a comparator comprising a first comparator terminal in communication with said array output terminal and a comparator output terminal, said comparator providing a comparator signal at said comparator output terminal in response to said regulated output voltage; and
    an output control module comprising a first control module input terminal in communication with said first array input terminal, a second control module input terminal in communication with said comparator output terminal, and a control module output terminal in communication with said second array input terminal, said output control module providing said second control signal at said control module output terminal in response to said comparator signal.

11. The circuit of claim 10 wherein said comparator further comprises a second comparator terminal configured to receive a first reference voltage, said comparator generating said comparator signal in response to said reference voltage and said output voltage.

12. The circuit of claim 10 wherein said capacitor array comprises a switched capacitor array.

13. The circuit of claim 10 wherein said capacitor array comprises a gain control terminal to receive a gain control signal.

14. The circuit of claim 13 further comprising a gain determination module comprising a first gain determination input terminal in communication with said supply voltage terminal, and a gain determination output terminal in communication with said gain control terminal, said gain determination module generating said gain control signal in response to said substantially DC voltage.

15. The circuit of claim 14 wherein said gain determination module comprises:

a supply voltage comparator comprising a first input terminal in communication with said first gain determination module input terminal, and a supply comparator output terminal, said supply voltage comparator generating a supply comparator signal at said supply comparator output terminal in response to said substantially DC input; and a pump-switches configuration control module comprising a configuration input terminal in communication with said supply comparator output terminal and a configuration output terminal in communication with said gain determination module output terminal, said pump-switches configuration control module generating said gain control signal at said configuration output terminal in response to said supply comparator signal.

16. The circuit of claim 14 wherein said gain determination module further comprises a second gain determination input terminal configured to receive a reference voltage, said gain determination module generating said gain control signal in response to said substantially DC voltage and said reference voltage.

17. The circuit of claim 16 wherein said gain determination module comprises:

a supply voltage comparator comprising a first input terminal in communication with said first gain determination module input terminal, a second input terminal in communication with said second gain determination module input terminal, and a supply comparator output terminal, said supply voltage comparator generating a supply comparator signal at said supply comparator output terminal in response to said substantially DC input voltage and said second reference voltage; and a pump-switches configuration control module comprising a configuration input terminal in communication with said supply comparator output terminal and a configuration output terminal in communication with said gain determination module output terminal, said pump-switches configuration control module generating said gain control signal in response to said supply comparator signal.

18. A circuit for generating a regulated output voltage comprising:

a capacitor array comprising a first array input terminal configured to receive a first control signal, a second array input terminal configured to receive a second control signal, a supply voltage terminal configured to receive a substantially DC voltage, a gain control terminal configured to receive a gain control signal, and an array output terminal for providing said regulated output voltage, said capacitor array generating an intermediate signal in response to said first control signal and said substantially DC voltage, said capacitor array generating said regulated output voltage at said array output terminal in response to said intermediate signal and said second control signal;

a comparator comprising a first comparator terminal in communication with said array output terminal, a second comparator terminal configured to receive a first reference voltage, and a comparator output terminal, said comparator providing a comparator signal at said comparator output terminal in response to said regulated output voltage and said first reference voltage;

an output control module comprising a first control module input terminal in communication with said first array input terminal, a second control module input terminal in communication with said comparator output terminal, and a control module output terminal in communication with said second array input terminal, said output control module providing said second control signal at said second control module output terminal in response to said comparator signal;

a supply voltage comparator comprising a first input terminal in communication with said supply voltage terminal, a second input terminal configured to receive a second reference voltage, and a supply comparator output terminal, said supply voltage comparator generating a supply comparator signal at said supply comparator output terminal in response to said substantially DC input voltage and said second reference voltage; and a pump-switches configuration control module comprising a configuration input terminal in communication with said supply comparator output terminal and a configuration output terminal in communication with said gain control input terminal, said pump-switches configuration control module generating said gain control signal in response to said supply comparator signal.

19. A circuit for generating a regulated output voltage comprising:

means for generating an intermediate signal in response to a first control signal, said intermediate signal having a variable an on time and a variable off time;

means for controlling the gain of a capacitor array in response to an array input voltage;

means for comparing said regulated output voltage and a first reference voltage to generate a second control signal; and means for generating said regulated output voltage in response to said intermediate signal and said second control signal.

20. A method for dynamically controlling a gain of a capacitor array comprising the steps of:

comparing an array output voltage to a first reference voltage and generating a first gain change signal in response thereto;

configuring said gain of said capacitor array in response to said first change signal;

generating a differential signal in response to said output voltage and a second reference voltage;

comparing said differential signal to a third reference voltage and generating a second gain change signal in response thereto; and configuring said gain of said capacitor array in response to said second change signal.

21. The method of claim 20 further comprising the step of filtering said differential signal to generate a filtered signal, and said step of comparing said differential signal comprises comparing said filtered signal to said third reference voltage to generate said second gain change signal.

22. The method of claim 20 further comprising the steps of:

comparing a supply voltage to a reference voltage and generating a third gain change signal in response thereto; and configuring said gain of said capacitor array in response to said third gain change signal.

23. The method of claim 20 wherein said first gain change signal is a decrement signal and said second gain change signal is a decrement signal.

24. A circuit for generating a regulated output voltage comprising:

a capacitor array comprising a first array input terminal configured to receive a first control signal, a second array input terminal configured to receive a second control signal, a supply voltage terminal configured to receive a substantially DC voltage, and an array output terminal for providing said regulated output voltage, said capacitor array generating an intermediate signal in response to said first control signal and said substantially DC voltage, said capacitor array generating said regulated output voltage at said array output terminal in response to said intermediate signal and said second control signal;

an error amplifier comprising a first amplifier input terminal in communication with said array output terminal, and an amplifier output terminal, said error amplifier providing an error signal in response to said regulated output voltage at said amplifier output terminal; and an output control module comprising a first control module input terminal in communication with said first array input terminal, a second control module input terminal in communication with said amplifier output terminal, and a control module output terminal in communication with said second array input terminal, said output control module providing said second control signal at said control module output terminal in response to said error signal and said first control signal.

25. The circuit of claim 24 wherein said error amplifier further comprises a second amplifier input terminal configured to receive a first reference voltage, said amplifier generating said error signal in response to said regulated output voltage and said reference voltage.

26. The circuit of claim 24 further comprising a filter, said filter comprising an input terminal in communication with said amplifier output terminal, and a filter output terminal in communication with said second output control module input terminal, said filter generating a filtered error signal at said filter output terminal in response to said error signal, wherein said output control module generates said second control signal in response to said first control signal and said filtered error signal.

27. A circuit for generating a regulated output voltage comprising:

a capacitor array comprising a first array input terminal configured to receive a first control signal, a second array input terminal configured to receive a second control signal, a supply voltage terminal configured to receive a substantially DC voltage, a gain control terminal configured to receive a gain control signal, and an array output terminal for providing said regulated output voltage, said capacitor array generating an intermediate signal in response to said first control signal and said substantially DC voltage, said capacitor array generating said regulated output voltage at said array output terminal in response to said intermediate signal and said second control signal;

an error amplifier comprising a first amplifier input terminal in communication with said array output terminal, and an amplifier output terminal, said error amplifier providing an error signal voltage at said amplifier output terminal in response to said regulated output;

an output control module comprising a first control module input terminal in communication with said first array input terminal, a second control module input terminal in communication with said amplifier output terminal, and a control module output terminal in communication with said second array input terminal, said output control module providing said second control signal at said control module output terminal in response to said error signal and said first control signal; and a gain determination module comprising a first gain determination input terminal in communication with said supply voltage terminal, a second gain determination input terminal configured to receive said regulated output voltage, a third gain determination input terminal configured to receive said error signal and a gain determination output terminal in communication with said gain control terminal, said gain determination module generating said gain control signal in response to said substantially DC voltage, said regulated output voltage, and said error signal.

28. The circuit of claim 27 wherein said error amplifier further comprises a second amplifier input terminal configured to receive a first reference voltage, said error amplifier providing said error signal at said amplifier output terminal in response to said first reference voltage and said regulated output voltage.

29. The circuit of claim 27 wherein the gain determination module comprises:

a first comparator comprising a first input terminal in communication with said second gain determination input terminal, and an output terminal, said first comparator generating first gain change signal in response to said regulated output voltage;

a second comparator comprising a first input terminal in communication with said third gain determination input terminal and an output terminal, said second comparator providing a second gain change signal in response to said error signal;

a gain setting module comprising a first input terminal in communication with said first gain determination input terminal, a second input terminal in communication with said first comparator output terminal, a third input terminal in communication with said second comparator output terminal, and an output terminal in communication with said gain determination output terminal, said gain setting module providing said gain control signal in response to said substantially DC voltage, said first gain change signal and said second gain change signal.

30. The circuit of claim 29 wherein said first comparator further comprises a second input terminal configured to receive a second reference voltage, said first comparator generating said first gain change signal in response to said regulated output voltage and said second reference voltage.

31. The circuit of claim 29 wherein said second comparator further comprises a second input terminal configure to receive a third reference voltage, said second comparator generating said second gain change signal in response to said error signal and said third reference voltage.

32. The circuit of claim 29 further comprising a filter, said filter comprising an input terminal in communication with said second gain determination input terminal, and an output terminal in communication with said first input terminal of said first comparator, said filter generating a filtered output signal in response to said regulated output voltage, said first comparator generating said first gain change signal in response to said filtered output signal.

33. A circuit for generating a regulated output voltage comprising:

a capacitor array comprising a first array input terminal configured to receive a first control signal, a second array input terminal configured to receive a second control signal, a supply voltage terminal configured to receive a substantially DC voltage, a gain control terminal configured to receive a gain control signal, and an array output terminal for providing said regulated output voltage, said capacitor array generating an intermediate signal in response to said first control signal and said substantially DC voltage, said capacitor array generating said regulated output voltage at said array output terminal in response to said intermediate signal and said second control signal;

an error amplifier comprising a first amplifier input terminal in communication with said array output terminal, and an amplifier output terminal, said error amplifier providing an error signal in response to said regulated output voltage at said amplifier output terminal;

a first filter comprising an input terminal in communication with said amplifier output terminal, and a first filter output terminal, said first filter providing a filtered error signal at said first filter output terminal in response to said error signal;

an output control module comprising a first control module input terminal in communication with said first array input terminal, a second control module input terminal in communication with said first filter output terminal, and a control module output terminal in communication with said second array input terminal, said output control module providing said second control signal at said control module output terminal in response to said filtered error signal and said first control signal;

a second filter comprising an input terminal in communication with said array output terminal, and a second filter output terminal, said second filter providing a filtered regulated output voltage in response to said regulated output voltage;

a first comparator comprising a first input terminal in communication with said second filter output terminal, and an output terminal, said first comparator generating a first gain change signal at said output terminal of said first comparator in response to said filtered regulated output voltage;

a second comparator comprising a first input terminal in communication with said first filter output terminal, and an output terminal, said second comparator providing a second gain change signal at said output terminal of said second comparator in response to said filtered error signal; and a gain setting module comprising a first input terminal configured to receive said substantially DC voltage, a second input terminal in communication with said first comparator output terminal, a third input terminal in communication with said second comparator output terminal, and an output terminal in communication with said gain control terminal of said capacitor array, said gain setting module providing a gain control signal at said output terminal of said gain setting module in response to said substantially DC voltage, said first gain change signal and said second gain change signal.

34. A circuit for providing a regulated output voltage comprising;

array circuitry adapted to apply a configurable gain state to a received input voltage for substantially a first half of a period of a charge cycle and to transfer charge from said array circuitry for a variable portion of a second half of said charge cycle;

gain control circuitry, in communication with said array circuitry, adapted to provide a gain control signal to said array circuitry in response to said input voltage;

comparison circuitry adapted to provide a comparison signal in response to said regulated output voltage and a first reference voltage; and control circuitry, in communication with said array circuitry and said comparison circuitry, adapted to provide a control signal to said array circuitry in response to a said comparison signal, said control signal determining said variable portion of said second half of said charge cycle.

\* \* \* \* \*